United States Patent [19]

Hollis et al.

[11] Patent Number: 5,385,117
[45] Date of Patent: Jan. 31, 1995

[54] POULTRY COLLECTION DEVICE

[76] Inventors: Calvin L. Hollis, Rte. 1 Box 12, Spearsville, La. 71277; William K. Carr, 136 Jacks Dr., El Dorado, Ark. 71730

[21] Appl. No.: 162,527

[22] Filed: Dec. 2, 1993

[51] Int. Cl.[6] .................... A01K 37/00; A01K 29/00
[52] U.S. Cl. .................................... 119/846; 56/328.1
[58] Field of Search .................... 119/846, 848, 845; 56/16.6, 327.1, 328.1

[56] References Cited

U.S. PATENT DOCUMENTS

| | | | |
|---|---|---|---|
| 3,672,335 | 6/1972 | Sanders | 119/846 |
| 4,297,832 | 11/1981 | Alper et al. | 56/328.1 |
| 4,467,745 | 8/1984 | Ledwell et al. | 119/846 |
| 4,600,351 | 7/1986 | Nelson | 119/846 |
| 4,602,594 | 11/1986 | Van den Brink | 119/82 |
| 4,669,423 | 6/1987 | Van den Brink | 119/82 |
| 4,766,850 | 8/1988 | O'Neill | 119/82 |
| 5,101,767 | 4/1992 | Williams et al. | 119/82 |

FOREIGN PATENT DOCUMENTS 1193869  9/1985  Canada .................. 119/846

Primary Examiner—John G. Weiss
Attorney, Agent, or Firm—John M. Harrison

[57] ABSTRACT

A poultry collection device for gathering poultry and loading the poultry into carrying cages. The poultry collection device includes a poultry-engaging assembly mounted on the front end of a wheeled frame, which assembly is characterized by a pair of rectangular panels, each fastened along a longitudinal edge to four spaced chains which each engage a pair of sprockets mounted on respective parallel cylinders elevated above the ground. As the device is driven forward, the cylinders and panels are rotated to push the poultry from the ground below the cylinders onto a conveyor belt, which carries the poultry rearwardly onto a sloped holding platform provided on the frame behind the conveyor belt. The poultry then tumble into one of three holding cages provided on the frame behind the holding platform. An emptying mechanism sweeps the poultry from the holding cages into a tiered, compartmented carrying cage placed on the rear end of the frame behind the holding cages. The holding cages may be elevated to align with the various tiers in the carrying cage.

23 Claims, 3 Drawing Sheets

POULTRY COLLECTION DEVICE

BACKGROUND OF THE INVENTION

1. Field of the Invention

The invention relates to devices for aiding in gathering poultry such as chickens and more particularly, to a poultry collection device for effectively gathering both massed and scattered poultry and loading the poultry into a tiered, compartmented cage mounted on the poultry collection device. In a preferred embodiment the poultry collection device includes a poultry-engaging assembly provided on the front end of a wheeled frame. The poultry-engaging assembly is characterized by a pair of rectangular panels, each of which is secured and spaced from the other along a longitudinal edge by four equally-spaced chains perpendicularly disposed with respect to the panels. Each chain is engaged by a pair of sprockets mounted on respective parallel, elongated cylinders, which are mounted on the frame and elevated with respect to the ground. As the poultry collection device is driven forward, the cylinders are rotated by a motor so that the panels are carried on the chains and push poultry which are on the ground below the cylinders, from the ground onto a conveyor belt. The conveyor belt includes a front portion which carries the poultry upwardly and rearwardly, and a rear portion pivotally attached to the front portion, which rear portion carries the poultry rearwardly and deposits the poultry on a platform included on the frame behind the conveyor belt. The poultry then slide or tumble into one of three adjacent holding cages provided on the frame behind the platform. A tiered and compartmented carrying cage is located on the frame behind the holding cages and the poultry are periodically swept rearwardly from the holding cages and into the carrying cage by an emptying mechanism characterized by a series of vertical fingers extending downwardly into each holding cage from a horizontal bar which is fastened at each end to a chain engaging a pair of sprockets provided on each upper lateral edge of each holding cage. A control seat, including a set of controls and instrumentation for allowing an operator to control the forward speed of the poultry collection device, the speed of the collection panels, the speed of the conveyor belt and the emptying of the poultry from the holding cages, is provided on the frame above the conveyor belt.

The conventional method of gathering poultry, either massed or scattered, is to catch them by hand. This, however, is extremely labor-intensive, time consuming and can result in injury to the poultry as they collide with each other and with other obstructions when trying to evade capture. The poultry collection device of this invention provides a safe and efficient means for gathering poultry, especially in commercial poultry houses, and automatically placing the poultry in tiered, compartmented carrying cages or boxes.

Metal carrying cages for transporting and storing poultry typically include five horizontal tiers, with three adjacent, horizontal openings at each tier for transporting the poultry to a processing plant. The conveyor belt, holding platform and holding cage elements of the poultry collection device of this invention may be elevated with respect to the frame, such that when one horizontal tier of the carrying cage is filled with poultry, the conveyor belt, holding platform and holding cages are raised to fill the next highest tier of the carrying cage.

2. Description of the Prior Art

Various apparatuses for collecting or packing poultry into containers are known in the art. U.S. Pat. No. 4,602,594, dated Jul. 29, 1986, to Hendrikus G. van den Brink, discloses a "Device for Packing Poultry in Boxes or Containers", characterized by an endless belt which is driven by several horizontal conveyor rollers and includes a belt portion which runs vertically upwardly from the ground. Spaced rows of fingers are hingedly connected to the belt and project forwardly as they are carried upwardly by the belt, carrying poultry from the ground onto a set of belts which deposits the poultry into a box. U.S. Pat. No. 4,669,423, dated Jun. 2, 1987, also to van den Brink, details a "Device for Packing Poultry In Boxes or Containers" which includes an endless belt fitted with fringes for engaging poultry and feeding the poultry into a feed-regulating device that discharges into a box. U.S. Pat. No. 4,766,850, dated Aug. 30, 1988, to James J. O'Neill, describes a "Method and Apparatus for Collecting and Conveying Objects From A Surface" characterized by a mobile frame provided on one end, with a rotatable paddle device which is extensible and elevatable with respect to the frame by means of arms connecting the paddle device to the frame. The paddle device is rotated so that poultry on the ground are urged onto an upwardly-running conveyor belt, which places the poultry on one of several multi-level conveyor belts included on the frame. The poultry are then packed into multilayered boxes or cages. U.S. Pat. No. 5,101,767, dated Apr. 7, 1992, to Owen C. Williams, et al, details a "Separator Counter", including a single upper level primary conveyor belt connected to twin lower level secondary conveyor belts by means of a divergent, fixed chute. The secondary conveyor belts move faster than the primary conveyor belt to further separate chickens on the primary belt from those on the secondary belt. A pair of diverging chutes is provided at the discharge end of the secondary conveyors to carry the chickens from the secondary belts into separate holding collection chambers.

It is an object of this invention to provide a poultry collection device for efficiently and effectively automatically gathering massed and scattered poultry and placing the poultry into cages or boxes, while minimizing injury to the poultry.

Another object of this invention is to provide a poultry collection device characterized by a wheeled frame and a poultry-engaging assembly mounted on the front end of the frame for engaging and pushing poultry from the ground onto an articulated or pivoted conveyor belt which angles upwardly from the ground and carries the poultry rearwardly, then places them on a sloped platform provided on the frame behind the conveyor belt, such that the poultry slide or tumble into one of three adjacent holding compartments or cages mounted on the frame behind the platform and provided with a holding cage emptying mechanism which urge the poultry from the holding cages into a carrying cage placed behind the holding cages, on the rear portion of the frame.

Still another object of this invention is to provide a poultry collection device including an elevatable conveyor belt, holding platform and holding cages, so that as soon as one horizontal tier of a multi-tiered carrying cage mounted on the device is filled with a maximum desired number of poultry, the conveyor belt, holding platform and holding cages can be elevated to fill the next highest tier of the carrying cage.

SUMMARY OF THE INVENTION

These and other objects of the invention are provided in a poultry collection device for effectively and efficiently gathering massed and scattered poultry from the ground and placing the collected poultry into tiered, compartmented carrying cages. The poultry collection device is characterized in a preferred embodiment by a wheeled frame provided on the front end thereof with a poultry-engaging assembly including a pair of rectangular panels, each of which is secured on a longitudinal edge in spaced relationship with respect to the other by four equally-spaced chains. Each chain is engaged by a pair of sprockets mounted on respective elongated, parallel cylinders mounted on the frame and elevated with respect to the ground, so that as the device is driven forward and the cylinders rotated, the panels are carried by the chains around the sprockets and urge poultry from the ground under the cylinders onto an upwardly-angled, articulated conveyor belt which carries the poultry rearwardly and then places them on a sloped platform provided on the frame behind the conveyor belt. The poultry then tumble or slide into one of three holding compartments or cages which are provided on the frame behind the platform and include a holding cage emptying mechanism characterized by multiple, vertical fingers extending downwardly from a horizontal bar fastened at each end to a chain engaging a pair of sprockets mounted on each lateral edge of the upper surface of each holding cage, such that as one of the sprockets of a pair is turned by a motor, the bar is carried by the chains and sweeps the fingers rearwardly and first urges the poultry into the lowermost level or tier of a multi-tiered carrying cage placed behind the holding cages on the rear portion of the frame. When the lowermost tier of the carrying cage is filled with poultry, the articulated rear segment of the conveyor belt, the holding platform and the holding cages are elevated so that the second tier and successive tiers of the carrying cage can be filled from the holding cages and so on, without interruption of the poultry-gathering operation.

BRIEF DESCRIPTION OF THE DRAWINGS

The invention will be better understood by reference to the accompanying drawing, wherein:

FIG. 4 is a perspective view of the center axle layout of the poultry collection device;

FIG. 5 is a top view of the frame and axle layout of the poultry collection device.

DESCRIPTION OF THE PREFERRED EMBODIMENTS

Figure 1:
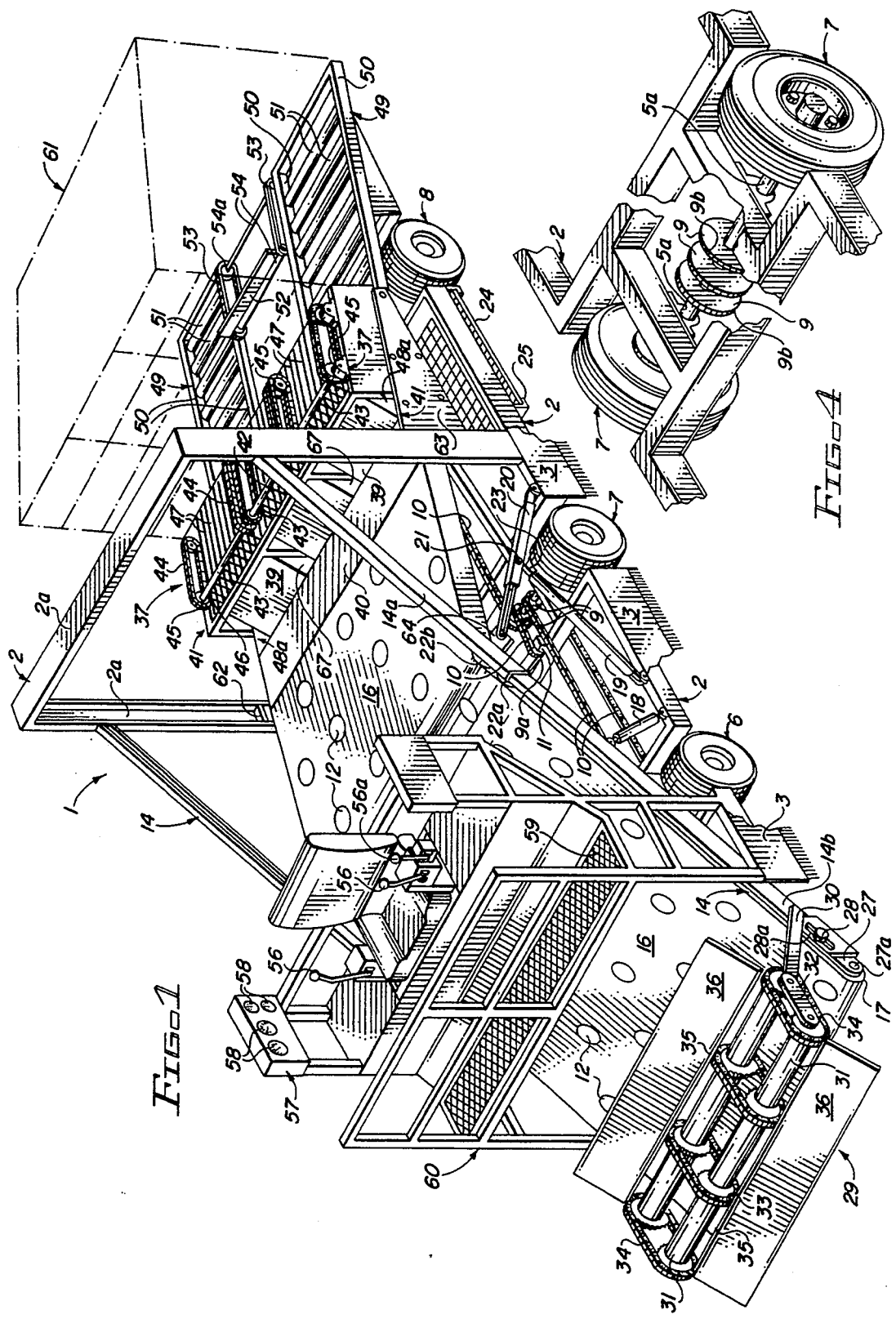
FIG. 1 is a perspective view of a preferred embodiment of the poultry collection device of this invention.

Referring initially to FIGS. 1, 2, 4 and 5 of the drawings, the poultry collection device of this invention is generally illustrated by reference numeral 1. The poultry collection device 1 is characterized by a main frame 2, including a pair of front wheels 6, each mounted on a separate front axle 5 which extends through a corresponding pair of parallel axle mounts 4, provided on each side of the front portion of the main frame 2, as illustrated in FIG. 5. A pair of middle wheels 7 and a pair of rear wheels 8 are carried by a similarly-mounted pair of middle axles 5a and rear axles 5b, mounted on corresponding axle mounts 4, respectively. Each of the two middle axles 5a is provided with three spaced axle sprockets 9, each of which includes multiple, adjacent sprocket teeth 9b, as illustrated in FIG. 4. The middle axle sprocket 9 mounted on each middle axle 5a is engaged by a continuous, short drive chain 10 which also engages a motor sprocket 9a, provided on the shaft of a hydraulic motor 11 mounted on the main frame 2 and spaced from each corresponding middle axle sprocket 9, as illustrated in FIGS. 1 and 5. The outer axle sprocket 9 mounted on each middle axle 5a is engaged by a longer drive chain 10, which also engages an axle sprocket 9 provided on the corresponding front axle 5, as further illustrated in FIGS. 1 and 5. Each of the two inner axle sprockets 9 mounted on the middle axles 5a is engaged by a similar drive chain 10, which also engages an axle sprocket 9 provided on the corresponding rear axle 5b, also as illustrated in FIG. 5. Accordingly, each of the respective sets of front axles 5, middle axles 5a and rear axles 5b are driven by operation of the hydraulic drive motor 11, the various axle sprockets 9 and the motor sprocket 9a.

Figure 2:
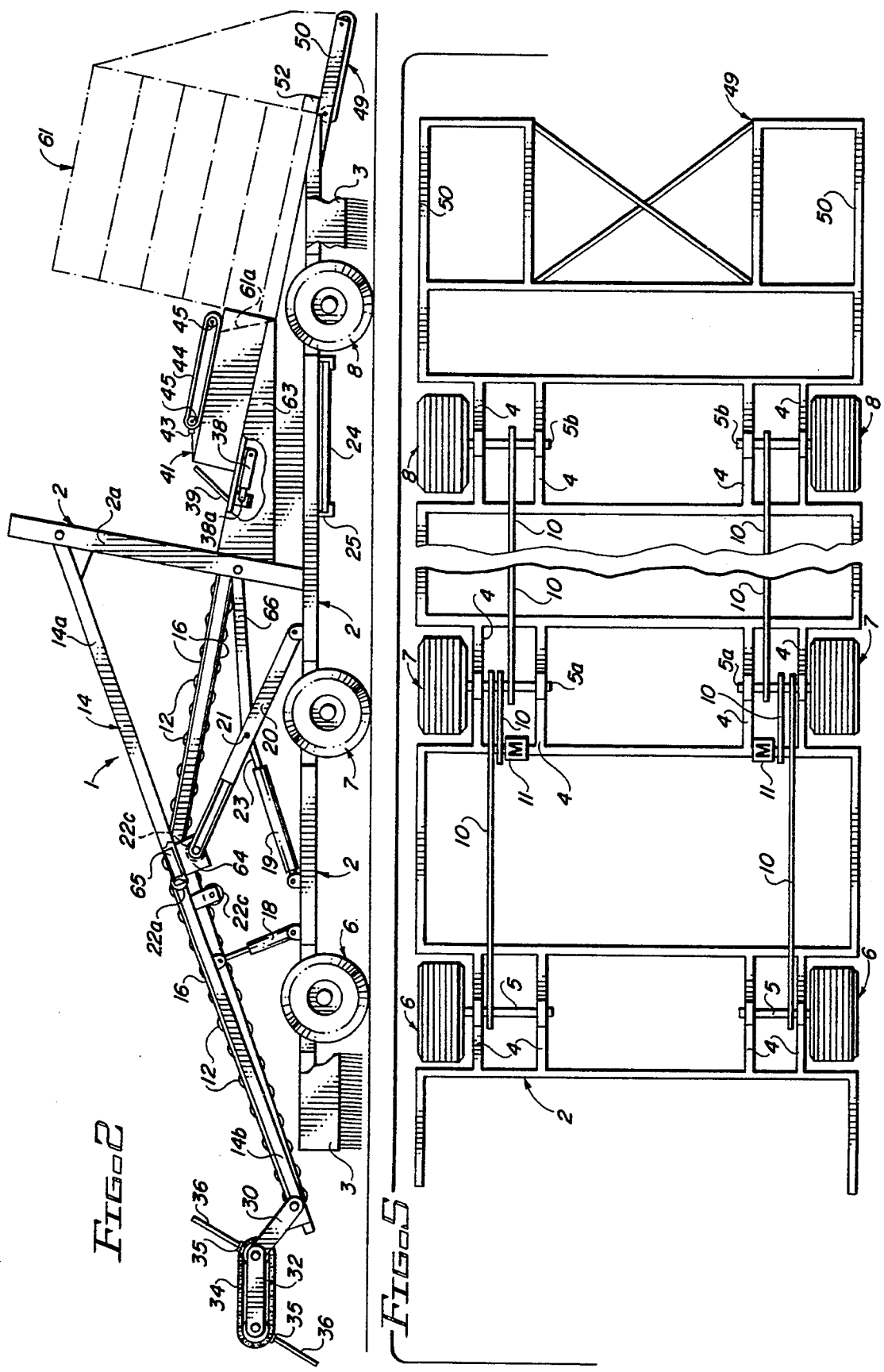
FIG. 2 is a side view of the poultry collection device illustrated in FIG. 1.
Figure 3:
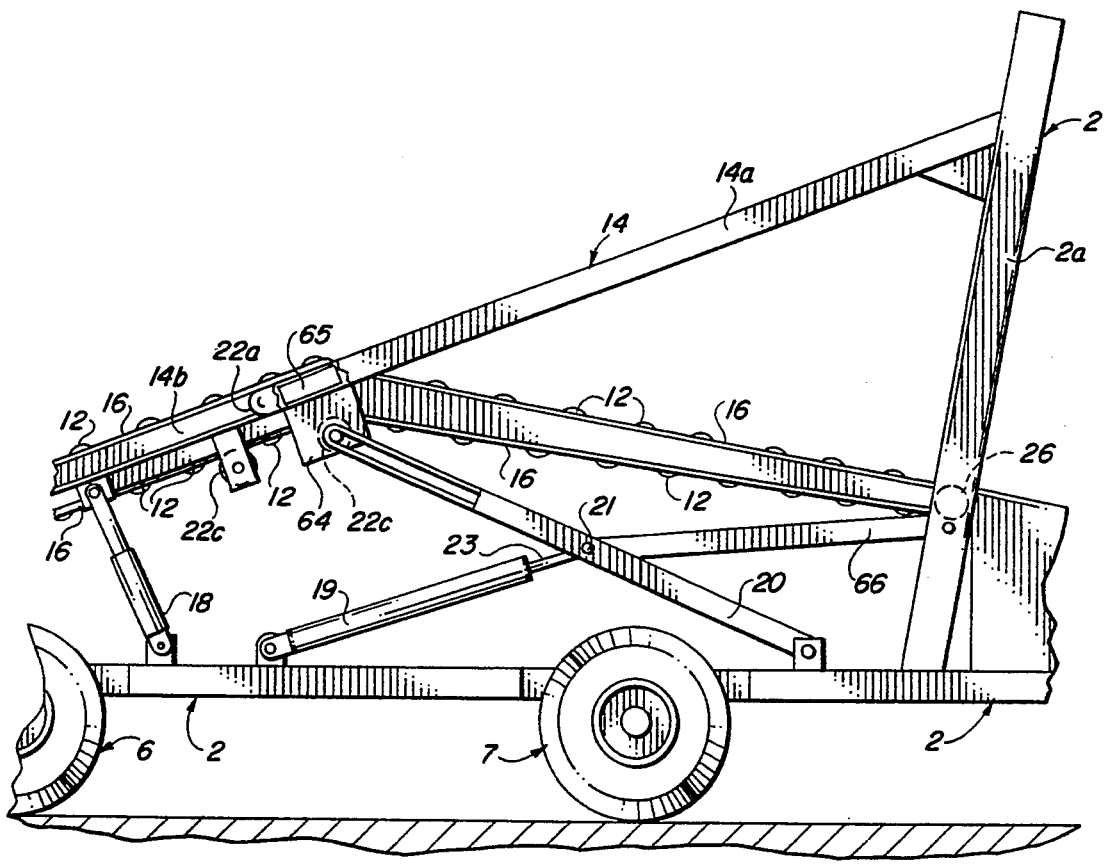
FIG. 3 is an enlarged side view of the center portion of the poultry collection device.

Referring now to FIGS. 1-5 of the drawings, guard fringes 3, constructed of a flexible material such as rubber or canvas, are mounted on the main frame 2 adjacent to each of the front wheels 6, middle wheels 7 and rear wheels 8, as illustrated in FIGS. 1 and 2. The guard fringes 3 drive the poultry away from the main frame 2 and prevent the front wheels 6, middle wheels 7 and rear wheels 8 from inadvertently rolling over poultry (not illustrated) on the ground. A slightly rearwardly-tilted main frame brace 2a includes two upright members, each of which extends upwardly at about a 15 degree angle with respect to the vertical from fixed attachment to the main frame 2, behind the corresponding middle wheel 7 and a horizontal member which spans the tops of the upright members. The upright members of the main frame brace 2a are each characterized by an inwardly-facing recessed channel surface. A conveyor frame 14 includes a pair of rear conveyor frame members 14a, each of which is welded or otherwise attached at one end to the front surface of a corresponding upright member of the main frame brace 2a and angles forwardly and downwardly, terminating at approximately the midpoint of the conveyor frame 14. Each rear conveyor frame member 14a is also characterized by an inwardly-facing recessed channel surface. A front conveyor frame member 14b extends from each rear conveyor frame member 14a in articulating relationship, since the articulated end of each front conveyor frame member 14b is pivotally mounted on the extending end of the corresponding rear conveyor frame member 14a. The front end of the conveyor frame 14, including the front connector frame members 14b, is maintained in a selected raised or lowered position with respect to the front portion of the main frame 2 by means of a conveyor frame cylinder 18, which is pivotally fastened to both the main frame 2 just behind the front wheel 6, and to the front conveyor frame member 14b. The extreme front end of each front conveyor frame member 14b slidably accommodates an extendible roller support 7. A front conveyor belt roller 17 is rotatably mounted between the roller supports 27, each end of the front conveyor belt roller 17 being engaged by a roller pin 27a, which extends through the corresponding roller support 27. Linear front and rear adjustment of the front conveyor belt roller 17 is varied by loosening a pair of adjusting bolts 28, which extend through a corresponding slot 28a, provided in each front conveyor frame member 14a and are threaded into the corresponding roller support 27. A first idler roller 22a is mounted between the front conveyor frame members 14b at the pivoting or articulated junction of the rear conveyor frame members 14a with the respective front conveyor frame members 14b, as illustrated in FIGS. 1 and 3. As further illustrated in FIG. 3, a slide block 65 is accommodated within the recess of each rear conveyor frame member 14a, behind the first idler roller 22a. Each slide block 65 is mounted on the top half of an offset idler roller plate 64. A second idler roller 22b is rotatably mounted between a pair of the fixed slide blocks 65, which receive the extending ends of the rear connector frame member 14a, in sliding relationship. A pair of third idler rollers 22c are rotatably mounted between and spaced from the idler roller plates 64, underneath and parallel to the second idler roller 22b, to support the return portion of a continuous conveyor belt 16, as hereinafter described.

Each upright member of the main frame brace 2a slidably accommodates a sliding rear roller mount 62, rotatably mounting a rear conveyor roller 26 (illustrated in phantom in FIG. 3) and a conveyor belt roller drive motor (not illustrated) is mounted on the inside surface of one of the rear roller mounts 62. The conveyor belt roller motor engages one end of the rear conveyor belt roller 26 and the opposite rear roller mount 62 engages the opposite end of the rear conveyor belt roller 26, such that the rear conveyor belt roller 26 is journalled for rotation on the spaced rear roller mounts 62. A continuous conveyor belt 16, having raised tread spots 12, travels on the front conveyor belt roller 17, the first idler roller 22a, the second idler roller 22b, the rear conveyor belt roller 26 and the third idler rollers 22c. Accordingly, the conveyor belt 16 extends around the rear conveyor belt roller 26 and forwardly under the first idler roller 22a and second idler roller 22b and over the third idler rollers 22c, then forwardly and downwardly and back around the front conveyor belt roller 17. That portion of the conveyor belt 16 located between the front conveyor belt roller 17 and the second idler roller 22b angles upwardly according to the slope of the front conveyor frame members 14b and that segment between the second idler roller 22b and the rear conveyor belt roller 26 initially angles downwardly, as illustrated in FIG. 1.

As illustrated in FIGS. 1 and 2, a slotted stabilizer 20 is pivotally mounted on each side of the main frame 2 just behind each middle wheel 7 and angles upwardly and forwardly to pivotally and slidably mount on the corresponding idler roller plate 64 on each side of the conveyor frame 14. A conveyor frame stabilizer 19 is also pivotally mounted on each side of the main frame 2, behind each conveyor frame cylinder 18 and angles upwardly and rearwardly to pivotally mount on the corresponding slotted stabilizer 20 by means of a stabilizer pin 21, which engages the slotted stabilizer 20 at approximately the midpoint thereof and also engages the stabilizer piston 23, extending from the upper end of the conveyor frame stabilizer 19. A roller mount bar 66 is pivotally secured to a corresponding one of the slotted stabilizers 20 at the stabilizer pin 21 and angles upwardly and rearwardly to pivotally mount on the corresponding rear roller mount 62, slidably disposed in the respective upright main frame braces 2a, as illustrated in FIG. 1.

Referring again to FIGS. 1–4 of the drawings, a poultry-engaging assembly 29 includes an assembly frame 30 which angles upwardly and forwardly from fixed attachment to the front of each front conveyor frame member 14b. A bar connector 32 is fastened to the upper end of each assembly frame 30 and extends forwardly therefrom, parallel to the ground. Two parallel, cylindrical sprocket bars 31 are rotatably mounted between the spaced, parallel bar connectors 32. The rear sprocket bar 31 is powered by a hydraulic motor (not illustrated), which is secured to one of the assembly frames 30 and engages the corresponding end of the rear sprocket bar 31. Four equally-spaced assembly sprockets 33, which are provided on the front sprocket bar 31, correspond adjacently with four equally-spaced assembly sprockets 33 mounted on the rear sprocket bar 31. Each pair of corresponding and aligned assembly sprockets 33 are engaged by a continuous assembly sprocket chain 34. Two spaced, rectangular collection panels 36 are each attached to a corresponding elongated chain bar 35, mounted on one longitudinal edge thereof and the four assembly sprocket chains 34 are perpendicularly secured to the chain bar 35 of each collection panel 36.

Figure 6:
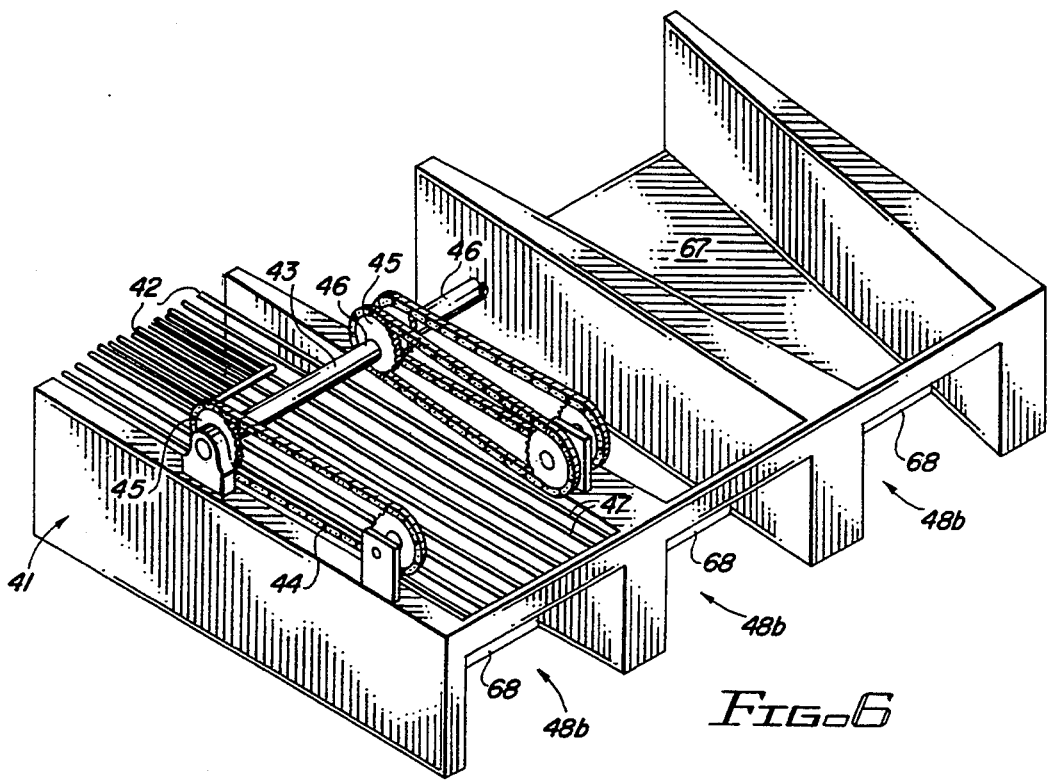
FIG. 6 is a perspective view of the holding cage layout of the poultry collection device.

Referring again to FIGS. 1–3 and 5 of the drawings, a rearwardly-sloped holding cage plate 63 is mounted above each side of the main frame 2 in front of each rear wheel 8, with the front vertical edge of each holding cage plate 63 secured to the corresponding rear roller mount 62. A rearwardly-sloped, rectangular landing panel 40 spans the front portion of the holding cage plates 63 and overlaps the conveyor belt 16. A holding cage floor panel 67 spans the holding cage plates 63, behind the landing panel 40. Three adjacent holding cages 41 are mounted on the holding cage floor panel 67 and each holding cage 41 includes a front opening 48a and a rear opening 48b, illustrated in FIG. 6. Three adjacent indentations 68 are provided on the rear portion of the holding cage floor panel 67 as further illustrated in FIG. 6, each of which lies within a corresponding holding cage 41. Multiple, spaced cage bars or rods 47 span the front and rear upper edges of each holding cage 41. Each holding cage 41 is further provided with a holding cage emptying assembly 37, including two sets of holding sprockets 45, mounted on the upper lateral edge of each holding cage 41. One of the holding sprockets 45 in each pair or set is mounted near the front edge and the other near the rear edge of the corresponding holding cage 41. A holding chain 44 engages both corresponding, aligned pairs of holding sprockets 45. The front holding sprockets 45 in each of the three holding cages 41 are all mounted on a common drive axle 46 and a holding finger bar 43 spans the two holding chains 44 of each holding cage 41. Multiple, equally-spaced, parallel holding fingers 42 extend perpendicularly from each holding finger bar 43, and travel between the cage rods 47 as the holding finger bar 43 travels on the holding chains 44. Three adjacent gate panels 39 are hingedly connected to the rear edge of the landing panel 40 and extend rearwardly into a corresponding holding cage 41. As illustrated in FIG. 3, the cylinder end of a gate cylinder 38 is pivotally attached to a flange extending downwardly from the holding cage floor panel 67, under each holding cage 41. The gate cylinder piston 38a of each gate cylinder 38 pivotally engages a flange mounted on a portion of the corresponding gate panel 39 which extends below the holding cage floor panel 67 and in front of the gate cylinder 38, to facilitate opening and closing the gate panels 39.

As further illustrated in FIGS. 1 and 2, a cage landing 49 is provided on the rearmost portion of the main frame 2 behind the holding cages 41, and includes rectangular, spaced, parallel landing frames 50, each of which extends rearwardly and downwardly from the rear edge of the corresponding lateral holding cage 41. Multiple, spaced, parallel and rotatable landing rollers 51 span the longitudinal members of each landing frame 50. Two spaced stabilizer axles 54 are rotatably mounted between the interior landing frames 50 behind the middle holding cage 41. Each end of both stabilizer axles 54 is provided with a stabilizer sprocket 54a. Each stabilizer sprocket 54a mounted on the anterior stabilizer axle 54, is engaged by a stabilizer chain 53, which also engages the corresponding aligned stabilizer sprocket 54a on the same end of the posterior stabilizer axle 54. A rectangular cage stabilizer 52 spans and is carried by the two stabilizer chains 53.

Referring again to FIG. 1 of the drawings, the front section of the main frame 2 includes a control frame 60, mounted above the conveyor belt 16. A control seat 55 is provided on the control frame 60 and includes directional control levers or sticks 56, mounted on both sides of the control seat 55. A foot grate 59 is included on the control frame 60 for supporting an operator's feet and an instrument panel 57, provided with various required gauges 58, is mounted adjacent to the control seat 55, for monitoring the respective hydraulic motors. Optionally useable sliding platforms 24 are slidably supported in corresponding platform frames 25, mounted on the main frame 2, as illustrated in FIGS. 1 and 2, to support additional operators, as necessary.

The poultry collection device 1 of this invention gathers and holds poultry, then places them into a multi-tiered, compartmented carrying cage 61, illustrated in phantom in FIGS. 1 and 2, in the following manner and sequence: referring again to FIGS. 1 and 2 of the drawings, a carrying cage 61, having five, 3-compartment horizontal tiers is placed on the cage landing 49, spanning the landing frames 50 and resting on the landing rollers 51. The three carrying cage doors 61a of the lowermost tier of the carrying cage 61 are pivoted forwardly and downwardly from a bottom hinge (not illustrated) and are each accommodated in sequence in the corresponding indentations 68 provided in the holding cage floor panel 67. An operator (not illustrated) sits on the control seat 55 and energizes a hydraulic stabilizer motor (not illustrated), which rotates the front stabilizer axles 54. The stabilizer sprockets 54a, provided on the front and rear stabilizer axles 54, drive the stabilizer chains 53, such that the cage stabilizer 52 is carried forwardly by the stabilizer chains 53. The cage stabilizer 52 exerts pressure against the rear end of the carrying cage 61, so that the carrying cage 61 rolls forwardly on the landing rollers 51 and then abuts snugly against the rear end of the holding cages 41. The conveyor belt motor (not illustrated) is then energized to rotate the rear conveyor belt roller 26, causing the conveyor belt 16 to travel first around the front conveyor belt roller 17, then upwardly and rearwardly over the first idler roller 22a and second idler roller 22b, and finally around the rear conveyor belt roller 26 and third idler rollers 22c. The poultry-engaging assembly 29 is also energized and the sprocket bar motor (not illustrated) rotates the rear sprocket bar 31, such that the assembly sprockets 33, mounted on the sprocket bars 31, drive the respective assembly sprocket chains 34, which causes the front sprocket bar 31 to rotate. The sprocket bars 31 thus rotate in tandem and the collection panels 36 are carried on the assembly sprocket chains 34 around the sprocket bars 31.

The operator engages the poultry collection device 1 in forward driving mode by manipulating the drive lever 56a. Each hydraulic drive motor 11 is thusly energized and rotates the corresponding motor sprocket 9a, as illustrated in FIGS. 1 and 5. Each aligned middle axle sprocket 9, mounted on each middle axle 5a, is driven by the corresponding short drive chain 10, which engages both the motor sprocket 9a and the corresponding middle axle sprocket 9. The middle axles 5a are thusly rotated by the respective hydraulic motors 11, such that the outer axle sprocket 9 mounted on each middle axle 5a drives the corresponding long drive chain 10 which engages both the outer axle sprocket 9 and the axle sprocket 9 provided on the corresponding front axle 5. The inner axle sprocket 9 mounted on each middle axle 5a drives the other corresponding long drive chain 10, which also engages the axle sprocket 9 mounted on the corresponding rear axle 5b. Thus, the front wheels 6, middle wheels 7 and rear wheels 8 are all driven by the two hydraulic motors 11. As the poultry collection device 1 is driven forward, the poultry engaging assembly 29 is suspended above poultry (not illustrated) which are on the ground just in front of the conveyor belt 16. The front collection panel 36, illustrated passing through the horizontal position downwardly in FIG. 1, assumes a vertical position as it is carried rearwardly below the sprocket bars 31 by the assembly sprocket chains 34 and urges poultry which are underneath the poultry-engaging assembly 29 onto the conveyor belt 16. Simultaneously, the rear collection panel 36, shown moving into a vertical position in FIG. 1, assumes a horizontal position as it reaches its extreme forward travel on the assembly sprocket chains 34. The poultry which are pushed onto the conveyor belt 16 by the collection panels 36 are stabilized thereon by the tread spots 12 and are carried rearwardly and upwardly on the conveyor belt 16, over the first idler roller 22a and second idler roller 22b. The conveyor belt 16 then carries the poultry further rearwardly and initially slightly downwardly as illustrated in FIG. 1 and deposits them on the landing panel 40. Because the landing panel 40 is sloped rearwardly, the poultry tumble or slide rearwardly and abut one of the gate spanels 39. The operator then actuates each gate cylinder 38 so that the gate cylinder piston 38a is extended forwardly and causes the corresponding gate panel 39 to pivot downwardly into the holding cage 41, as illustrated in FIG. 2. The poultry then fall through the front opening 48a into the corresponding holding cage 41. The operator subsequently actuates each gate cylinder 38 so that each gate cylinder piston 38a is retracted and the corresponding gate panel 39 is pivoted upwardly, thereby closing the holding cage 41. When the holding cages 41 are filled with poultry, the operator activates the holding cage emptying assembly 37 by energizing a hydraulic motor (not illustrated) associated with the drive axle 46. The front holding sprockets 45 then drive the respective holding chains 44 and holding finger bars 43 rearwardly, beneath the holding sprockets 45. The holding fingers 42 are thus carried rearwardly with the holding finger bars 43, thereby pushing the poultry through the rear openings 48b of the respective holding cages 41 and into the corresponding and aligned lowermost horizontal tier of the carrying cage 61. The holding finger bars 43 then reach the respective rear holding sprockets 45 of the corresponding holding cages 41 and are carried on the holding chains 44 around the rear holding sprockets 45. When each holding finger bar 43 is carried forwardly by the corresponding holding chains 44, the corresponding holding fingers 42 extend vertically upwardly and when the holding finger bar 43 is carried around the front holding sprockets 45, the holding fingers 42 extend horizontally forwardly, as illustrated in FIG. 3. As the holding finger bars 43 are carried forwardly, poultry continue to enter the holding cages 41 and the holding fingers 42 continue to push poultry rearwardly into the respective tiers of the carrying cage 61.

Referring again to FIGS. 1 and 3 of the drawings, when the lowermost horizontal tier of the carrying cage 61 contains the maximum desired number of poultry, the articulated rear portion of the conveyor belt 16, the landing panel 40 and the holding cages 41 are elevated in concert by raising the rear roller mounts 62 together, so that the holding cages 41 can be aligned with the second horizontal tier of the carrying cage 61. Poultry can then be loaded from the holding cages 41 into the second horizontal tier of the carrying cage 61, as described above. The operator raises the rear roller mounts 62 by energizing the conveyor frame stabilizers 19 using suitable hydraulic controls (not illustrated) and the stabilizer pistons 23 are extended in concert from the cylinder end of the corresponding conveyor frame stabilizer 19, thus causing the slotted stabilizers 20 to pivot rearwardly, as illustrated in FIGS. 1-3, in a scissor-like lifting motion. This action causes the pivotally-mounted roller mount bars 66 to pivot on the slotted stabilizers 20 and rear roller mounts 62, and assume a more vertical orientation as they force the corresponding rear roller mount 62 upwardly within the channel recess of the upright members of the main frame brace 2a. The slotted stabilizers 20 also cause the idler roller plates 64 to travel rearwardly on the corresponding conveyor frame 14, such that the second idler rollers 22b and third idler roller 22c are carried with the idler roller plates 64 and the slide blocks 65 slide inside the respective fixed rear conveyor frame members 14a. To adjust the tension in the conveyor belt 16, the adjusting bolts 28 on each front conveyor frame member 14b are loosened, so that as each idler roller plate 64 is raised, the roller supports 27 and front conveyor belt roller 17 can move rearwardly. Since they are fastened to the rear roller mounts 62, the parallel holding cage plates 63, landing panel 40 and rear conveyor belt roller 26 are all raised from their original position as the rear roller mounts 62 travel upwardly on the upright members of the main frame brace 2a. When the holding cages 41 have reached the desired height to align the holding cages 41 with the second tier of the carrying cage 61, extension of the stabilizer pistons 23 from the cylinders of the conveyor frame stabilizers 19 is stopped. The carrying cage doors 61a of the first tiers are closed and the second tier of the carrying cage 61 is then loaded with poultry in the same manner heretofore described with respect to the first tier. When the second tier of the carrying cage 61 has been filled with the maximum desired number of poultry, the stabilizer pistons 23 of the conveyor frame stabilizers are further extended until the holding cages 41 reach the level of the third tier of the carrying cage 61 and the loading process is repeated. After the top tiers of the carrying cage 61 are thusly loaded with poultry, the carrying cage 61 is removed from the cage landing 49 of the poultry collection device 1 after operating the cage stabilizer! 52 in reverse to release pressure on the carrying cage 61. An empty carrying cage 61 is then loaded on the cage landing 49 in place of the filled carrying cage 61 and the cage stabilizer 52 is again operated as heretofore described to secure the carrying cage 61 in loading position.

It will be appreciated by those skilled in the art that the poultry collection device 1 of this invention may be used to fill single, as well as multiple tiered cages, having one or more cage compartments, as desired. Since the operator can control the respective gate panels 39 of the corresponding holding cages 41, he can direct the poultry into selected holding cages 41 and from there, into selected compartments of the carrying cage 61.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A poultry collection device for collecting poultry and delivering the poultry to a carrying cage having tiers, comprising a wheeled frame; poultry-engaging means mounted on one end of said wheeled frame for engaging the poultry; conveyor means adjustably carried by said wheeled frame for receiving the poultry from said poultry-engaging means; lift means slidably carried by said frame; and at least one holding cage means carried by said lift means adjacent to the carrying cage, whereby poultry are collected by said poultry-engaging means and delivered to said conveyor means and said holding cage means for further delivery to selected tiers of the carrying cage, responsive to operation of said lift means.

2. The poultry collection device of claim 1 wherein said poultry-engaging means comprises a pair of drums rotatably carried by said wheeled frame and at least one panel carried by said drums for engaging the poultry and sweeping the poultry onto said conveyor means.

3. The poultry collection device of claim 1 wherein said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said poultry-engaging means and delivering the poultry to said holding cage means.

4. The poultry collection device of claim 1 wherein:
(a) said poultry-engaging means comprises a pair of drums rotatably carried by said wheeled frame and at least one panel carried by said drums for engaging the poultry and sweeping the poultry onto said conveyor means; and
(b) said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said panel and delivering the poultry to said holding cage means.

5. The poultry collection device of claim 1 wherein said lift means comprises a lift frame carried by said wheeled frame, roller mount means slidably carried by said lift frame and receiving said opposite end of said conveyor means and said holding cage and scissor means carried by said wheeled frame and connected to said roller mount means, whereby said opposite end of said conveyor means and said holding cage are selectively raised and lowered with respect to said wheeled frame responsive to raising and lowering of said roller mount means on said lift frame by operation of said scissor means.

6. The poultry collection device of claim 5 wherein said poultry-engaging means comprises a pair of drums rotatably carried by said wheeled frame and at least one panel carried by said drums for engaging the poultry and sweeping the poultry onto said conveyor means.

7. The poultry collection device of claim 5 wherein said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said poultry-engaging means and delivering the poultry to said holding cage means.

8. The poultry collection device of claim 5 wherein:
(a) said poultry-engaging means comprises a pair of drums rotatably carried by said wheeled frame and at least one panel carried by said drums for engaging the poultry and sweeping the poultry onto said conveyor means; and
(b) said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said panel and delivering the poultry to said holding cage means.

9. The poultry collection device of claim 1 wherein said holding cage means comprises a holding cage having a bottom, substantially parallel sides extending from said bottom and an open top, with a plurality of rods disposed in said top and extending to define opposite ends of said holding cage, said rods oriented in spaced, substantially parallel relationship with respect to each other and finger means slidably movable over said rods and extending between said rods for traversing the length of said holding cage between said ends and said sides and sweeping the poultry from said holding cage into the carrying cage.

10. The poultry collection device of claim 9 wherein said lift means comprises a lift frame carried by said wheeled frame, roller mount means slidably carried by said lift frame and receiving said opposite end of said conveyor means and said holding cage and scissor means carried by said wheeled frame and connected to said roller mount means, whereby said opposite end of said conveyor means and said holding cage are selectively raised and lowered with respect to said wheeled frame responsive to raising and lowering of said roller mount means on said lift frame by operation of said scissor means.

11. The poultry collection device of claim 10 wherein said poultry-engaging means comprises a pair of drums rotatably carried by said wheeled frame and at least one panel carried by said drums for engaging the poultry and sweeping the poultry onto said conveyor means.

12. The poultry collection device of claim 10 wherein said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said poultry-engaging means and delivering the poultry to said holding cage.

13. The poultry collection device of claim 10 wherein:
(a) said poultry-engaging means comprises a pair of drums rotatably carried by said wheeled frame and at least one panel carried by said drums for engaging the poultry and sweeping the poultry onto said conveyor means; and
(b) said conveyor means comprises a conveyor frame having a fixed end connected to said wheeled frame and a movable end pivotally connected to said fixed end, a plurality of rollers rotatably carried by said conveyor frame and an endless belt carried by said rollers for receiving the poultry from said panel and delivering the poultry to said holding cage.

14. A poultry collection device for collecting poultry and delivering the poultry in sequence to the tiers of a tiered carrying cage supported by the poultry collection device, comprising a wheeled frame; poultry-engaging means rotatably carried by said wheeled frame for engaging the poultry; conveyor means mounted on said wheeled frame, with one end of said conveyor means adjustably carried by said wheeled frame adjacent to said poultry-engaging means for receiving poultry engaged by said poultry-engaging means and the opposite end of said conveyor means pivotally attached to said wheeled frame; lift means carried by said wheeled frame and attached to said opposite end of said conveyor means for selectively lifting said opposite end of said conveyor means with respect to said wheeled frame; and at least one holding cage means carried by said lift means and communicating in sequence with the tiers of the tiered carrying cage, whereby said opposite end of said conveyor means and said holding cage means are lifted to align said holding cage means with the tiers of the tiered carrying cage, responsive to operation of said lift means.

15. The poultry collection device of claim 14 wherein said poultry-engaging means comprises a pair of drums rotatably carried by said wheeled frame and at least one panel carried by said drums for engaging the poultry and sweeping the poultry onto said conveyor means.

16. The poultry collection device of claim 14 wherein said conveyor means comprises a conveyor frame, a plurality of rollers rotatably carried by said conveyor frame and an endless belt carried by said rollers for receiving the poultry from said poultry-engaging means and delivering the poultry to said holding cage means.

17. The poultry collection device of claim 14 wherein:
(a) said poultry-engaging means comprises a pair of drums rotatably carried by said wheeled frame and at least one panel carried by said drums for engaging the poultry and sweeping the poultry onto said conveyor means; and
(b) said conveyor means comprises a conveyor frame, a plurality of rollers rotatably carried by said conveyor frame and an endless belt carried by said rollers for receiving the poultry from said panel and delivering the poultry to said holding cage means.

18. The poultry collection device of claim 14 wherein said lift means comprises a lift frame carried by said wheeled frame, roller mount means slidably carried by said lift frame and receiving said opposite end of said conveyor means and said holding cage and scissor means carried by said wheeled frame and connected to said roller mount means, whereby said opposite end of said conveyor means and said holding cage are selectively raised and lowered with respect to said wheeled frame to align with the tiers of the tiered carrying cage, responsive to raising and lowering of said roller mount means on said lift frame by operation of said scissor means.

19. The poultry collection device of claim 14 wherein said holding cage means comprises a holding cage having a bottom, substantially parallel sides extending from said bottom and an open top, with a plurality of rods disposed in said top and extending to define opposite ends of said holding cage, said rods oriented in spaced, substantially parallel relationship with respect to each other and finger means slidably movable over said rods and extending between said rods for traversing the length of said holding cage between said ends and said sides and sweeping the poultry from said holding cage into the carrying cage.

20. The poultry collection device of claim 14 wherein:
(a) said lift means comprises a lift frame carried by said wheeled frame, roller mount means slidably carried by said lift frame and receiving said opposite end of said conveyor means and said holding cage and scissor means carried by said wheeled frame and said roller mount means, whereby said opposite end of said conveyor means and said holding cage are selectively raised and lowered with respect to said wheeled frame to align with the tiers of the tiered carrying cage, responsive to raising and lowering of said roller mount means on said lift frame; and
(b) said holding cage means comprises a holding cage having a bottom, substantially parallel sides extending from said bottom, and an open top, with a plurality of rods disposed in said top and extending to define opposite ends of said holding cage, said rods oriented in spaced, substantially parallel relationship with respect to each other and finger means slidably movable over said rods and extending between said rods for traversing the length of said holding cage between said ends and said sides and sweeping the poultry from said holding cage into the carrying cage.

21. The poultry collection device of claim 20 wherein said poultry-engaging means comprises a pair of drums rotatably carried by said wheeled frame and at least one panel carried by said drums for engaging the poultry and sweeping the poultry onto said conveyor means.

22. The poultry collection device of claim 20 wherein said conveyor means comprises a conveyor frame, a plurality of rollers rotatably carried by said conveyor frame and an endless belt carried by said rollers for receiving the poultry from said poultry-engaging means and delivering the poultry to said holding cage.

23. A poultry collection device for collecting poultry and delivering the poultry to the respective horizontal tiers of a tiered carrying cage supported by the poultry collection device, comprising a wheeled frame; drive means carried by said frame for propelling said frame; poultry-engaging means rotatably carried by said wheeled frame for engaging the poultry; a conveyor having a conveyor frame with one end of said conveyor frame adjustably mounted on said wheeled frame and the opposite end of said conveyor or frame pivotally connected to said wheeled frame a plurality of rollers rotatably carried by said conveyor frame and an endless belt carried by said rollers, said one end of said conveyor located adjacent to said poultry-engaging means for receiving poultry engaged by said poultry-engaging means; lift means carried by said wheeled frame and attached to said opposite end of said conveyor for selectively lifting said opposite end of said conveyor with respect to said wheeled frame; and at least one holding cage carried by said lift means and communicating with the tiers of the tiered carrying cage, said holding cage having a bottom, substantially parallel sides extending from said bottom and an open top, with a plurality of rods disposed in said top and extending to define opposite ends of said holding cage, said rods oriented in spaced, substantially parallel relationship with respect to each other and finger means slidably movable over said rods and extending between said rods for traversing the length of said holding cage between said ends and said sides and sweeping the poultry from said holding cage into the carrying cage, whereby said opposite end of said conveyor and said holding cage are lifted to align said holding cage with the tiered carrying cage, responsive to operation of said lift means.

* * * * *